(12) United States Patent
Cranford, Jr. et al.

(10) Patent No.: US 7,289,572 B2
(45) Date of Patent: Oct. 30, 2007

(54) METHOD AND SYSTEM FOR SCALABLE PRE-DRIVER TO DRIVER INTERFACE

(75) Inventors: Hayden C. Cranford, Jr., Apex, NC (US); Westerfield J. Ficken, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 10/265,755

(22) Filed: Oct. 7, 2002

(65) Prior Publication Data

US 2004/0066855 A1 Apr. 8, 2004

(51) Int. Cl.
*H04L 27/00* (2006.01)

(52) U.S. Cl. .................. 375/295; 375/297; 326/30; 327/158; 327/295; 714/43

(58) Field of Classification Search .............. 375/295, 375/297; 326/30; 327/158, 295; 714/43
See application file for complete search history.

(56) References Cited

U.S. PATENT DOCUMENTS

| | | | |
|---|---|---|---|
| 4,405,916 A | | 9/1983 | Hornak et al. |
| 5,257,289 A | | 10/1993 | Jopson |
| 5,610,507 A | | 3/1997 | Brittan |
| 5,781,060 A | | 7/1998 | Sugawara |
| 5,898,321 A | * | 4/1999 | Ilkbahar et al. ............ 326/87 |
| 6,006,169 A | | 12/1999 | Sandhu et al. |
| 6,047,346 A | * | 4/2000 | Lau et al. .................. 327/158 |
| 6,072,349 A | | 6/2000 | Pippin et al. |
| 6,298,002 B1 | * | 10/2001 | Brooks et al. ............. 365/227 |
| 6,353,921 B1 | * | 3/2002 | Law et al. .................... 716/17 |
| 6,420,899 B1 | * | 7/2002 | Crittenden et al. ........... 326/30 |
| 6,425,097 B1 | * | 7/2002 | Elachkar et al. ............. 714/43 |
| 6,583,659 B1 | * | 6/2003 | Kwong et al. ............. 327/295 |

FOREIGN PATENT DOCUMENTS

| | | |
|---|---|---|
| JP | 57-150227 | 9/1982 |
| JP | 03-117019 | 5/1991 |
| JP | 05-268050 | 10/1993 |
| JP | 07-170711 | 7/1995 |
| JP | 09-214315 | 8/1997 |
| JP | 11-312969 | 11/1999 |

* cited by examiner

Primary Examiner—Curtis Odom
(74) Attorney, Agent, or Firm—Sawyer Law Group LLP

(57) ABSTRACT

A system and method for a predriver and driver interface having scalable output drive capability with corresponding scalable power is disclosed. The system includes a predriver to driver interface having a data source; a plurality of predrivers, each coupled to the data source and responsive to an enable signal, for driving a predriven data signal only when a corresponding enable signal is asserted and for consuming reduced power when the corresponding enable signal is deasserted; a plurality of drivers, each coupled to one of the plurality of predrivers to receive a corresponding predriven data signal from the corresponding predriver and responsive to the enable signal coupled to the corresponding predriver, for driving an output with the predriven data signal only when the corresponding enable signal is asserted and for consuming reduced power when the corresponding enable signal is deasserted; and a controller, coupled to the predrivers and the drivers, for selectively asserting the enable signals to provide variable output drive capability of the data source to the output while providing scalable power consumption.

4 Claims, 3 Drawing Sheets

METHOD AND SYSTEM FOR SCALABLE PRE-DRIVER TO DRIVER INTERFACE

FIELD OF THE INVENTION

The present invention relates generally to power consumption control of a data transmitter, and more specifically to a predriver and driver interface having scalable output drive capability with corresponding scalable power.

BACKGROUND OF THE INVENTION

Although the advantages of reducing power consumption in semiconductor devices are well known, some standard circuit configurations of the prior art do not provide as great of saving in power consumption as is possible. For example, FIG. 1 is a schematic block diagram of a current driver interface 100 architecture. Interface 100 includes a data source 105, a predriver 110 and a driver 115. Data source 105 is a latch or other well-known system and in the example of FIG. 1 operates to convert the data into a differential signal. Predriver 110 receives the differential data from source 105 and produces sufficient drive to turn on a transistor M1 and a transistor M2 in driver 115. The current in a transistor M3 in driver 115 determines the capability of driver 115.

The prior art typically reconfigures or operates on driver 15 in attempting to achieve improved power savings for interface 110. Because of the configuration of driver 115, including M1 and M2, predriver 110 is typically operated at full power to properly interact with driver 115, thereby preventing one avenue of potential power savings.

Accordingly, what is needed is a system and method for a predriver and driver interface having scalable output drive capability with corresponding scalable power. The present invention addresses such a need.

SUMMARY OF THE INVENTION

A system and method for a predriver and driver interface having scalable output drive capability with corresponding scalable power is disclosed. The system includes a predriver to driver interface having a data source; a plurality of predrivers, each coupled to the data source and responsive to an enable signal, for driving a predriven data signal only when a corresponding enable signal is asserted and for consuming reduced power when the corresponding enable signal is deasserted; a plurality of drivers, each coupled to one of the plurality of predrivers to receive a corresponding predriven data signal from the corresponding predriver and responsive to the enable signal coupled to the corresponding predriver, for driving an output with the predriven data signal only when the corresponding enable signal is asserted and for consuming reduced power when the corresponding enable signal is deasserted; and a controller, coupled to the predrivers and the drivers, for selectively asserting the enable signals to provide variable output drive capability of the data source to the output while providing scalable power consumption. The interfacing method for a predriver to driver interface includes the steps of: (a) providing a plurality of independently actuable driver stages in a semiconductor device, each stage including an independently selectable and actuable predriver coupled to a corresponding selectable and actuable driver for driving an output at a drive capability while operating at an incremental power for each driver stage; and (b) providing a control system to enable selectively a plurality of the driver stages to drive the output at a sufficient level at incrementally increasing power levels as additional driver stages are enabled.

The present invention efficiently addresses both scaling output drive capability to match desired design points while better scaling power consumption of the interface so that unnecessary power is not used.

DETAILED DESCRIPTION

The present invention relates to a predriver and driver interface having scalable output drive capability with corresponding scalable power consumption by having a modular predriver and driver architecture. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
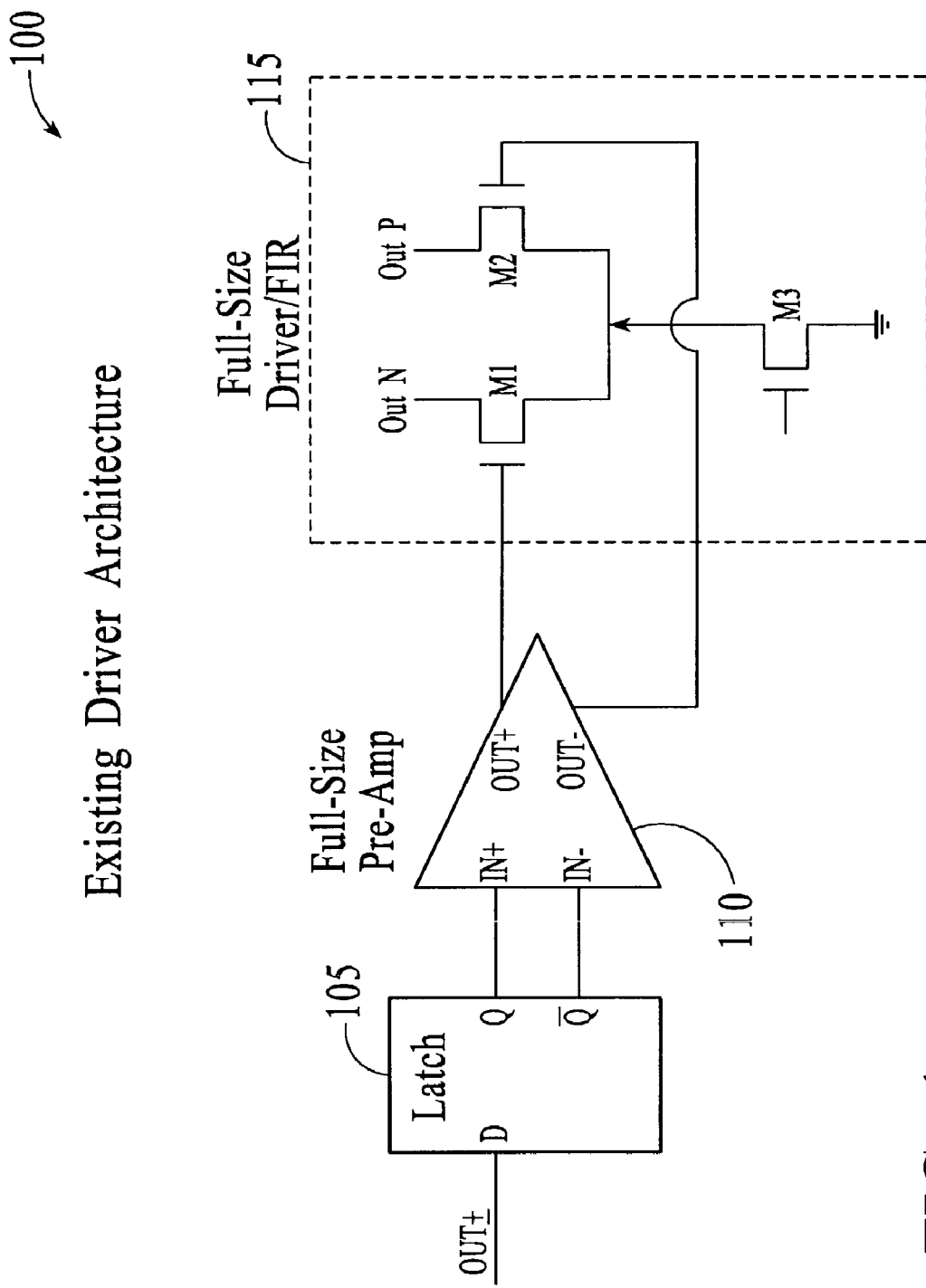
FIG. 1 is schematic block diagram of a prior art driver interface architecture.
Figure 2:
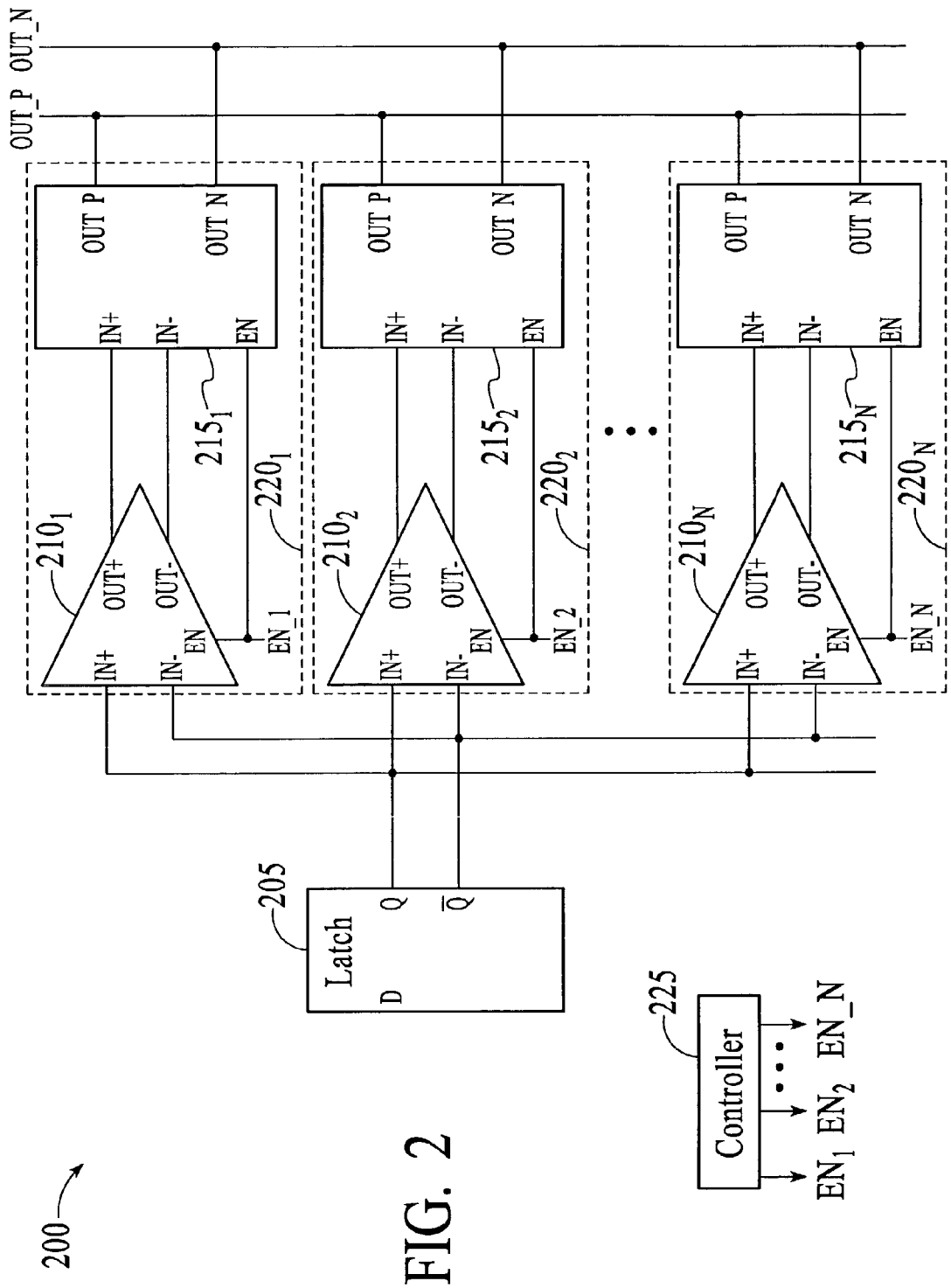
FIG. 2 is a schematic block diagram of a preferred embodiment for a predriver to driver interface.

FIG. 2 is a schematic block diagram of a preferred embodiment for a predriver to driver interface 200. Interface 200 includes a data source 205, N number of predrivers $210_x$ and a corresponding number N of drivers/FIR output stages $215_x$. Each combination of predriver $210_x$ and driver/FIR output stage $215_x$ is a driver stage $220_x$ and operates functionally similarly to a combination of predriver 110 and driver 115 shown in FIG. 1, with the addition of enabling controls for selectively activating individual driver stages $220_x$. This has the added advantage that the device sizes in the predriver and driver may be scaled to smaller size and lower power than is the case when a single predriver/driver is used as shown in FIG. 1.

Each stage $220_x$ is responsive to a corresponding signal $EN_x$ for enabling each stage $220_x$ to drive an output with data from data source 205. In one implementation, the data source 205 converts input data into a differential signal, as shown in FIG. 2. Each driver stage $220_x$ of the preferred embodiment is provided in parallel and scaled to provide useful quanta of incremental drive capability and corresponding power consumption. A controller 225 provides individually assertable enable signals $EN_1$ through $EN_N$.

In one implementation, interface 200 is implemented as a static solution in that once the necessary drive capability of interface 200 has been determined, controller 225 asserts the appropriate enable signals $EN_1$ through $EN_N$ to achieve the necessary drive capability and the configuration never changes. Controller 225 may be made very simple or primitive in order to control the enable signals $EN_x$. In some instances as appropriate, controller 225 may be implemented as hard wired connections to power or ground or other appropriate logic signals. In other implementations, controller 225 may be more sophisticated and dynamically change the configuration of the assertion of the enabling signals $EN_x$ to driver stages $220_x$ to match or adapt changing drive capability needs of interface 200. This has the advantage that deselected drive stages $220_x$ are in reduced power mode/turned off and interface 200 thus achieves just the right level of drive capability without using unnecessary power.

In the preferred embodiment, each driver stage 220 provides a predetermined drive capability with the same power consumption per driver stage. In other implementations, driver stages are scaled differently such as for example with one stage providing one unit of drive capability, a second stage providing twice the drive capability of the first driver stage, and a third stage providing four times the drive capability of the first driver stage.

Figure 3:
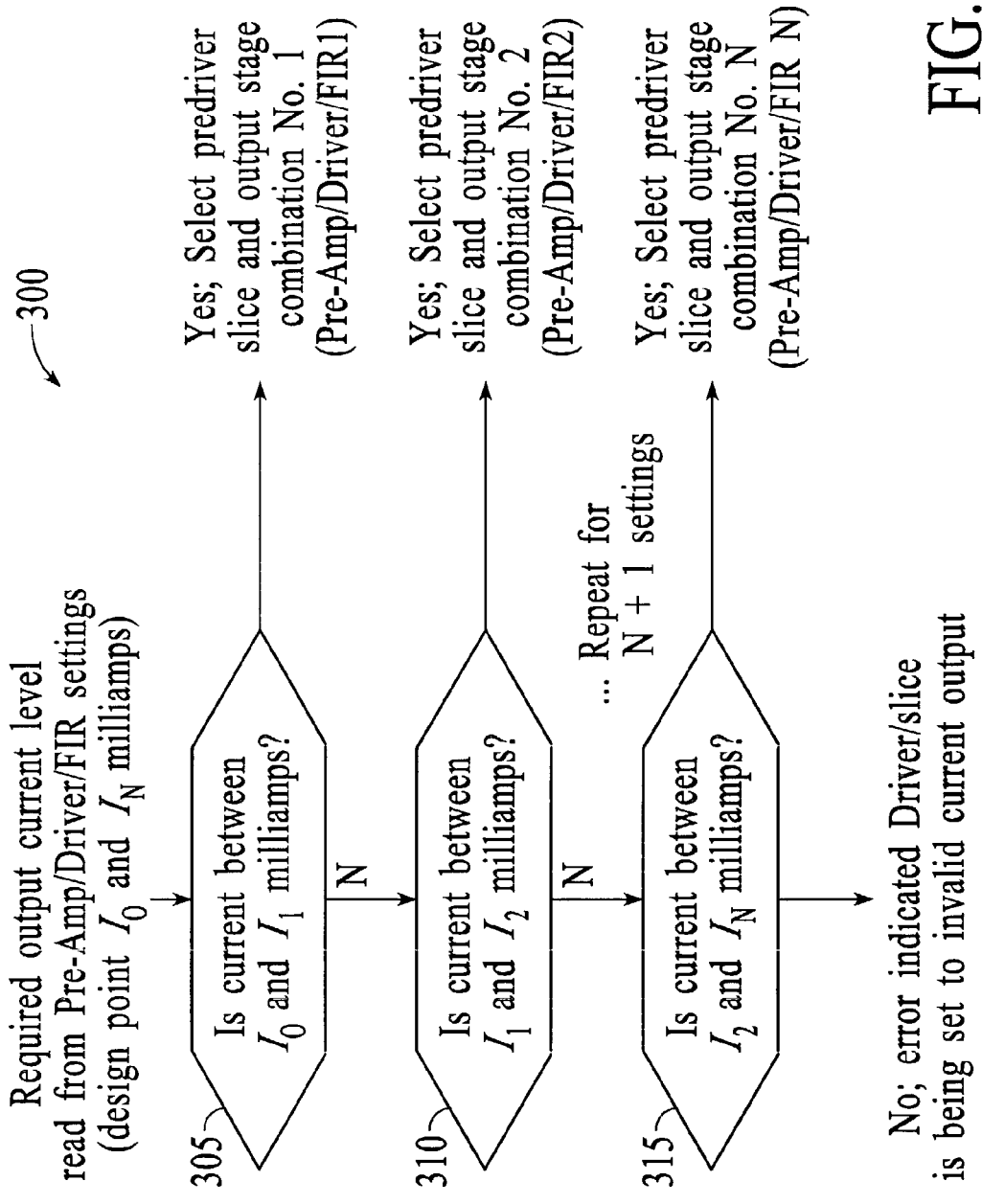
FIG. 3 is a flowchart for determining predriver/output stage enablement.

FIG. 3 is a flowchart for determining predriver/output stage enablement by selection process 300. Process 300 starts by having a priori knowledge of required/desired output current level. At step 305, process 300 determines whether the output current level is between $I_0$ and $I_1$. If so, process 300 has controller 225 assert enable signal $EN_x$ to configure interface 200. If not, process 300 advances to step 310 to determine whether the output current level is between $I_x$ and $I_2$. If so, process 300 has controller 225 assert enable signals $EN_x$ and $EN_2$ to configure interface 200. If not, process 300 continues to stepwise cycle through the remainder of its potential combinations in similar fashion to determine whether the output current level is between $I_2$ and $I_N$. If so, controller 225 appropriately asserts $EN_1$ through $EN_N$ to provide the correct drive capability. If no combination of driver stages 225 achieves the necessary driver capability, process 300 returns an error indication.

In some implementations, a threshold power consumption ceiling may also be specified. As combinations of the driver stages are asserted to achieve the desired drive capability, the power consumption level of interface 200 is also determined and process 300 may provide a warning or error condition if the threshold power consumption is exceeded.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A predriver to driver interface comprising:
   a data source;
   a plurality of predrivers, each predriver being coupled to the data source and coupled to only a single corresponding enable signal, each predriver to predrive a data signal from the data source only responsive to the single corresponding enable signal being asserted;
   a plurality of drivers, each driver being coupled to a corresponding predriver, each driver to receive a corresponding predriven data signal from the corresponding predriver and being connected to the single enable signal coupled to the corresponding predriver, each driver for driving an output with the predriven data signal only responsive to the single enable signal coupled to the corresponding predriver being asserted; and
   a controller coupled to the plurality of predrivers and the plurality of drivers, the controller configured to dynamically change assertion of each enable signal to provide variable output drive capability of the data signal to the output,
   wherein the controller is further configured to monitor a power level consumption the plurality of predrivers and the plurality of drivers being asserted though a corresponding enable signal and provide a warning or error condition responsive to the power level consumption exceeding a pre-determined threshold power consumption ceiling.

2. The predriver to driver interface of claim 1, wherein each of the plurality of predrivers and each of the plurality of drivers are powered off when the single corresponding enable signal is deasserted.

3. The predriver to driver interface of claim 1, wherein each predriver and corresponding driver forms a corresponding driver stage of the predriver to driver interface, each driver stage having about the same drive capability relative to each other.

4. The predriver to driver interface of claim 1, wherein each predriver and corresponding driver forms a corresponding driver stage of the predriver to driver interface, each driver stage having a different drive capability relative to each other.

* * * * *